DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 29, 1970

878 O.G. 1149

T878,023

POLYOLEFINE COMPOSITION

Robert John Taylor, Welwyn Garden City, and Raymond Deverell-Smith and Colin William Greenhalgh, Manchester, England, assignors to Imperial Chemical Industries Limited, Millbank, London, England, a corporation of Great Britain

Filed Apr. 3, 1970, Ser. No. 25,548

Claims priority, application Great Britain, Apr. 23, 1969, 20,802/69

Int. Cl. C08f *45/14;* C09b *1/26*

U.S. Cl. 260—41

No Drawing. 7 Pages Specification

Transparent, coloured "TPX" includes anthraquinone dyestuffs having a high solubility in hydrocarbons. The dyestuffs are singly substituted with long side chains containing more than 8 carbon atoms.